FREQUENCY CONTROLLER

Filed March 9, 1945 3 Sheets-Sheet 1

INVENTOR
RICHARD H. RANGER
BY William D. Hall
ATTORNEY

FREQUENCY CONTROLLER

Filed March 9, 1945 3 Sheets-Sheet 2

INVENTOR
RICHARD H. RANGER

BY William D. Hall.
ATTORNEY

INVENTOR
RICHARD H. RANGER
BY William D. Hall.
ATTORNEY

Patented Feb. 6, 1951 2,540,139

UNITED STATES PATENT OFFICE 2,540,139

FREQUENCY CONTROLLER

Richard H. Ranger, Newark, N. J.

Application March 9, 1945, Serial No. 581,813

2 Claims. (Cl. 250—36)

Figure 1A:
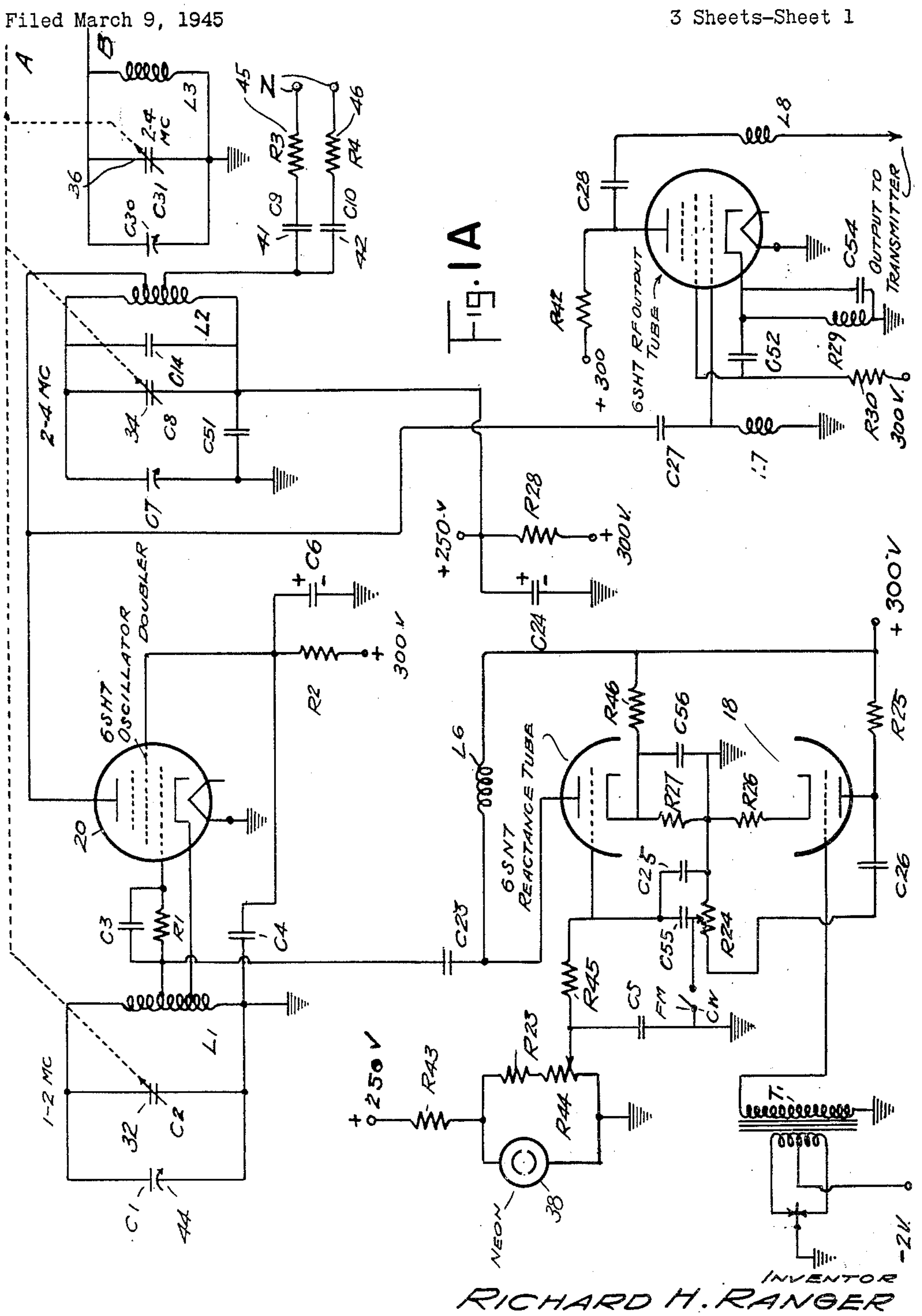

(Granted under the act of March 3, 1883, as amended April 30, 1928; 370 O. G. 757)

The invention described herein may be manufactured and used by or for the Government for governmental purposes, without the payment of any royalty thereon.

The radio spectrum is very crowded. In order to make the maximum use of it, all communication apparatuses must be closely controlled to the frequency at which they are designed to operate.

It is an object of this invention to provide a control for a radio frequency oscillator or generator. This control is operative over a wide band of frequencies yet can accurately maintain the controlled apparatus within a frequency range of one cycle. Moreover, this controller can provide an accurate, stable control in conjunction with frequency modulation (FM).

A controller which achieves these objects may consist of a section comprising a crystal-controlled master oscillator whose output may be manually selected to provide frequencies separated for example by intervals of 100 kc. or by 10 kc. There is also provided a selector oscillator whose output is varied by an adjustable element. The frequency outputs of these two oscillators are mixed and provide the output frequency of the controller. The adjustable element referred to above is moved by a motor responsive to any difference in the frequencies of the two oscillators so that the output frequency is effectively and quickly restored to that preselected and set. The master oscillator contains but a single crystal. The varying output frequencies are selected by utilizing harmonics of the crystal frequency. It is of definite advantage to use but a single crystal.

This invention relates to means for controlling the frequency of radio frequency (RF) voltages. This device consists essentially of a manually controlled oscillator which automatically adjusts itself to zero beat with any one of the channels of a crystal-controlled multi-vibrator. This control is afforded by a correcting element such as a condenser automatically driven from a motor actuated by the beat between the frequency of the master or controlled oscillator and the multivibrator frequency standard.

A particular use of the voltage emitted by this device is as excitation voltage for a radio transmitter, at any one of two-hundred (200) different frequencies in the 2–4 mc. band. This frequency controller requires only one crystal but provides all these two hundred (200) operating frequencies with an accuracy which is controlled by the crystal to substantially one cycle.

By means of this frequency control the signal output of the transmitter can be amplitude modulated (AM), or frequency modulated (FM).

The device consists of an oscillator section which is to be controlled, a reference section, and a corrector section. The first section includes an oscillator tunable from 2 to 4 mc. and a reactance-tube. By variations of the bias on the reactance-tube grid, the frequency of the oscillator can be varied over a small range. The second or reference section is made up of a 100 kc. crystal-controlled, multi-vibrator type, oscillator locking a 10 kc. blocking type oscillator and a harmonic amplifier which amplifies any desired harmonic of the multi-vibrator in the 2–4 mc. band. The output of the controlled oscillator is mixed with the desired harmonic and the resultant low frequency beat is supplied to the corrector section.

Advantages of my device are the simplicity of the principle involved, the simplicity of the circuits, the compactness and ruggedness, yet the extreme sensitivity, of this frequency correcting mechanism. Its use is possible in such applications as in single-crystal, multi-channel, push button oscillators or transmitters having any number of channels with any degree of channel separation without having to resort to selecting mechanisms having a high degree of resetability with wear compensation and without the problem of ganging selective RF stages, and without resorting to low-drift circuits.

An important feature of this invention is the provision of a disc-type motor as opposed to a multi-polar motor. Such a motor is similar to a standard, commercial, house-type watt-hour meter but has micro ball bearings making the motor rugged and able to operate equally well in any position. The motor also has field coils to drive the disc and drive mechanism connected to a midget, variable air-gap condenser. The principle of operation is that of the rotating field of the induction motor. The metallic disc is free to revolve between the pole pieces associated with coils 26 and 28 (shown in Fig. 1C). The alternating magnetic fluxes from these pole pieces will establish currents in the disc. The impedances of the motor circuits which include the pairs of coils 26 and 28, respectively, differ in their ratio of reactance to resistance so that there is a phase difference between the eddy currents set up in the disc by the current passing through these coils. This is clear from the fact that, as may be seen from Fig. 1C, each coil 28 has in series with it a resistance, while each coil 26 has in series with it a capacitance. Since the E. M. F. generated in a conductor by a flux, which cuts it, is in time quadrature with the flux, it follows that when the fluxes from coils 26 and 28 are approximately 90 electrical degrees apart, the eddy currents produced in the disc by the flux from coils 26 will be at a maximum at almost the same instant that the flux from coils 28 is at a maximum and contrariwise, the eddy currents set up in the disc by the fluxes from coils 28 (one quarter period later) will be at a maximum at almost the same instant that the flux from coils 26 is at a maximum. Thus a torque will be produced which is proportional to the instantaneous product of the eddy currents in the disc and the flux from the pole pieces associated with the coils, through which current is flowing. This torque is very smooth and uniform in action. The disc is able to start from any position. A description of such a motor is to be found in Standard Handbook for Electrical Engineers, McGraw-Hill Book Company, Inc., seventh edition, page 168.

Further objects of this invention will be apparent as this description proceeds. For further expositions of my invention reference is hereby tendered to the annexed drawing and specification at the end whereof, the novel features of the invention are specifically pointed out and claimed.

The single figure of the drawing is a schematic diagram showing the electric circuit connections and the mechanical attachments. It is divided into three parts, A, B, and C, for convenient showing on three sheets.

Figure 1B:
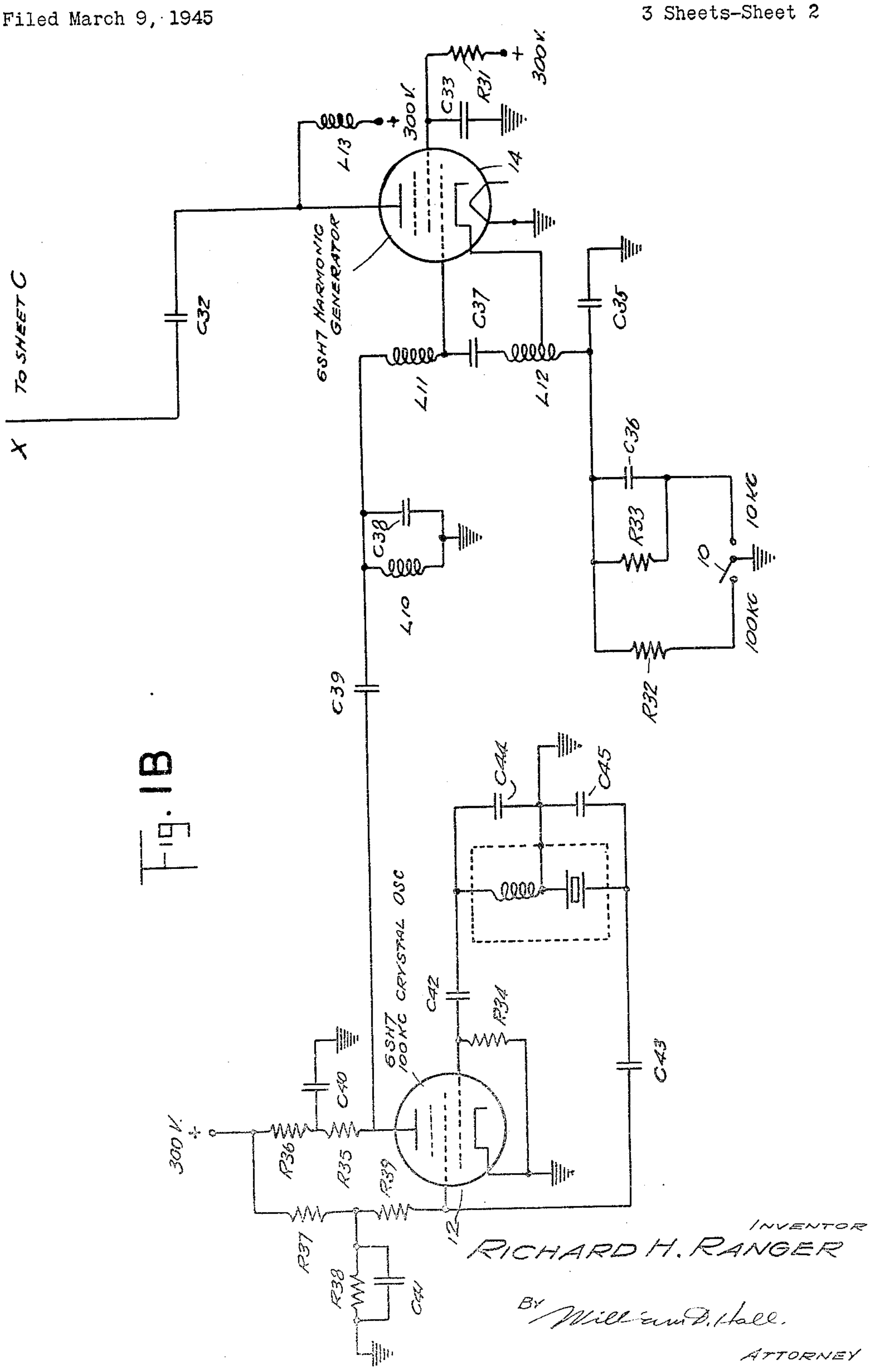
Figure 1C:
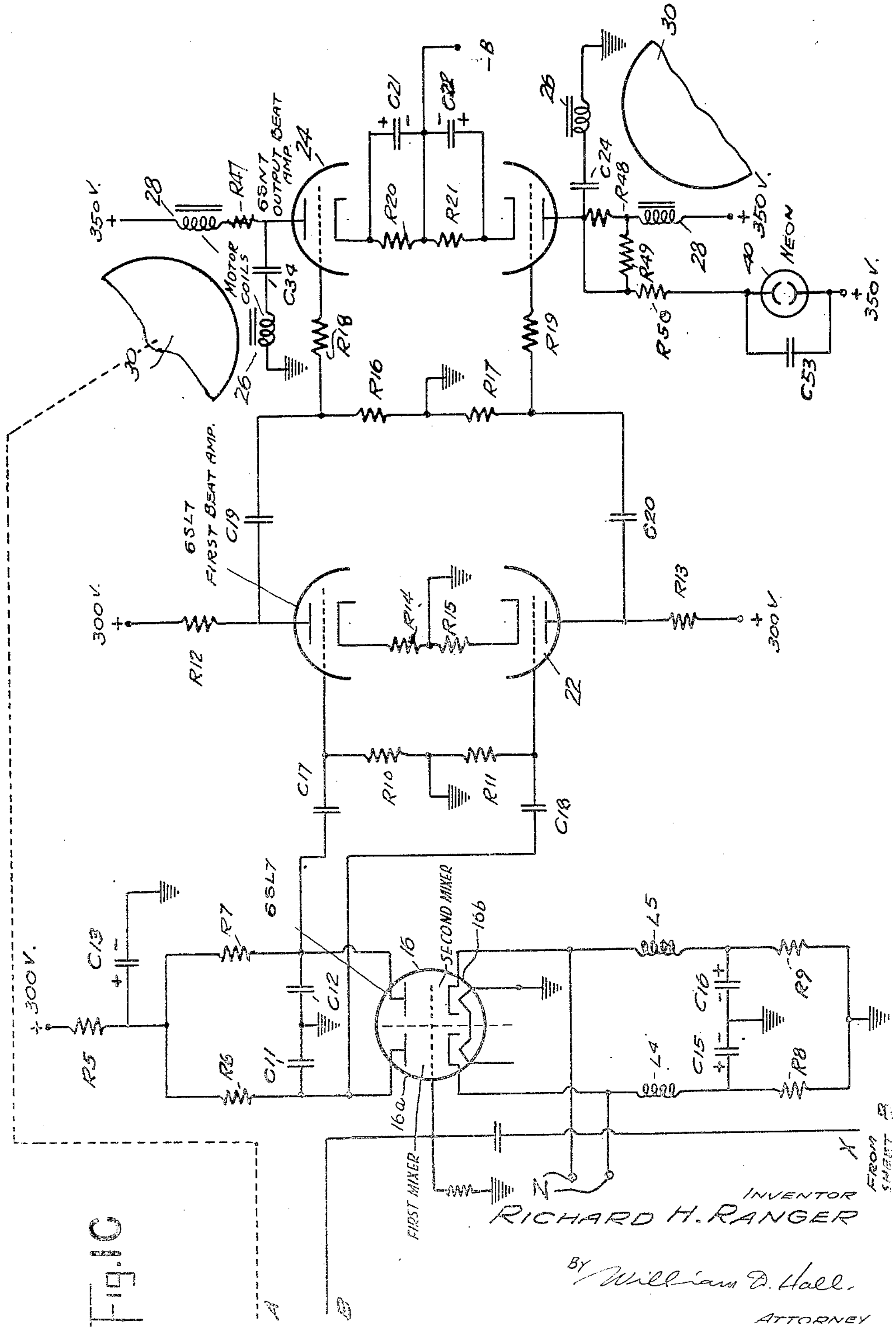

Referring to that modification of my invention which has been selected from among others for illustration in the drawings and description in the specification, there is disclosed in Fig. 1B a manually operable switch 10 which controls the 100 kc. crystal-controlled oscillator 12 so that it affords either a 100 kc. or 10 kc. interval in each output. This output is fed through harmonic generator 14 to the grids of mixtures 16*a* and 16*b* (see Fig. 1C). As shown in Fig. 1A, the oscillator whose frequency is to be controlled comprises an oscillation tube 20 the grid of which tube is connected to reactance tube 18. Dual tube 16 comprises mixer sections 16*a* and 16*b*. The output of tube 20 is applied to the grid circuit of 16*a* and 16*b* by means of phase shifting network 41, 45 and 42, 46 (shown in Fig. 1A) and through terminals Z (shown in Figs. 1A and 1C) so that the output from tube 16*a* is out of phase with the output of tube 16*b*. The output from the reference oscillator 12 is fed through harmonic generator 14 to both grids of tube 16 so that the outputs appearing in the plate circuit of the 16*a* and 16*b* due to the reference oscillator are in phase. The reference frequency output from 14 and the output from the controlled oscillator 20 mix in tube 16*a* to form a beat note equal to the frequency difference. Likewise the reference output signal frequency and the controlled oscillator output frequency mix in tube 16*b* to form a beat note equal to the frequency difference. Since there is a difference in phase in the signals introduced in the grid circuit due to the phase shifting network, it follows that the beat note in the output of tube 16*a* will be out of phase with the beat note in output of tube 16*b*.

These beat notes are then amplified by respective portions of tube 22 and by the two sections of output beat amplifier 24. In the plate circuit of tube 24 are connected pairs of motor coils 26 and 28 (see Fig. 1C). Mounted adjacent these coils is the aluminum motor disc 30 so that the magnetic fields of the coils induce eddy currents in the disc 30 as explained above. The reaction by the two fields thus induced drives the disc in one direction or the other or holds it stationary depending upon whether the master oscillator frequency is lower or higher or the same as the reference oscillator frequency. Rotor or disc 30 is mounted by means of micro ball bearings which provide a rugged support therefor and permit this correcting motor to operate efficiently in any position. This motor drives condensers 32, 34, and 36 (see Fig. 1A) in such a direction as to always tune the master or controlled oscillator to zero beat with the reference or crystal controlled oscillator. This gives an automatic frequency control employing the motor driven condensers 32, 34 and 36 in the grid circuit of the electron coupled oscillator. If the output frequency of this oscillator starts to drift either above or below the selected frequency of the reference oscillator these motor-driven condensers will automatically turn in the direction to prevent the drift. This correcting mechanism is very sensitive to small changes of the controlled oscillator frequency. A drift of this oscillator of 5 cycles above or below the selected frequency of the crystal-controlled multi-vibrator results in an approximately 10 degrees revolution of the motor disc 30 and immediate correction to within approximately 1 cycle (actually less) of the frequency of the reference oscillator.

The drift of the controlled oscillator is within 1 cycle of the drift of the reference 100 kc. crystal in cycles per second.

The correcting mechanism corrects for a change in the controlled oscillator corresponding to a 3000 cycle drift each side of the selected reference frequency under normal temperature and line voltage conditions. This is a compensation for a drift of 1.5 per cent at the lowest operating frequency. This amount of compensation is accomplished by the automatic capacity change in the controlled oscillator circuit of approximately 1 per cent. This percentage change at the permissible low ratio L/C circuits of the doubler and harmonic selector tuned by the same condenser gang with the master oscillator does not affect the circuit alignment sufficiently to produce a measurable drop in RF output. It is possible with this unit to correct for an oscillator drift corresponding to 1.5 per cent without any change of RF output.

The torque of the correcting motor 26, 28, and 30 increases as the beat by the controlled oscillator and the reference oscillator approaches zero and is maximum in the range from zero to 5 cycles. This unit functions better for a slow, gradual drift than for a large initial frequency difference. When the field coils of the motor resonate at approximately 15 cycles then the disc torque is maximum at approximately zero beat. The resonating range of the energizing coils 26 and 28 determines the frequency range for which the unit will correct an instantaneous shifting of oscillator frequency. When mounted in a vehicle the vibration causes the corrector mechanism to function as well as it does when stationary. If the initial frequency difference is large the vibration apparently helps the motor disc 30 to seek the position of zero beat a little faster than when stationary. Since the correcting mechanism can be constructed to be rugged and still be sensitive it is enabled to withstand the vibration encountered in vehicular service.

It is possible to shift from FM to AM type transmission without any noticeable effect on carrier frequency or RF output.

This compensator corrects the drift of the controlled oscillator on FM as well as on AM. On FM, during modulation, the main carrier is kept at the reference frequency.

The correcting mechanism permits reactance tube modulation on an oscillator without the usual disadvantages of oscillator instability due to the unstable characteristics of a reactance tube.

For the purpose of aiding tuning, a neon tube 38 (see Fig. 1A) is connected to a grid circuit of tube 18 and a neon tube 40 (see Fig. 1C) is connected to a plate circuit of tube 24.

The operation of my device is as follows:

Suppose it is desired to set the oscillator to 2530 kc. With the switch 10 in the 100 kc. position the master oscillator 20 is adjusted to the 2500 kc. crystal harmonic. One means of making this adjustment is by manually turning adjustable condenser 44 (see Fig. 1A). When the oscillator is within 10 or 20 cycles of zero beat the neon tube flashes at beat frequency. When the neon tube flashes in this way the setting of the oscillator is satisfactory. The switch 10 is then moved into the 10 kc. position and the controlled oscillator tuned to select the 30 kc. channel. Adjust the output frequency of the selector oscillator until the neon tube flashes to show that the oscillator is close to zero beat. The oscillator is then set to 530 kc. and will be held there automatically. When it is desired to set to a new frequency the motor driven condensers 32, 34, and 36 are returned to their center position where the condensers afford the widest range of control. Switch 10 is then affixed so that the blocking oscillator blocks at 100 kc. and the harmonic generator therefore only supplies 100 kc. harmonics. It is then easy to find a desired 100 kc. point. Switch 10 is then adjusted and the desired 10 kc. point is selected.

One embodiment of this invention which has given satisfactory results has circuit elements and components having the characteristics listed in the following table.

*Legend to circuit diagram*

$C_1$, $C_7$ $C_{30}$, $C_{44}$, $C_{45}$—50 mmf.
$C_2$, $C_8$, $C_{31}$—225 mmf.
$C_3$, $C_{23}$, $C_{27}$, $C_{37}$—100 mmf.
$C_4$, $C_{26}$, $C_{42}$, $C_{43}$—0.01 mf.
$C_5$, $C_{17}$, $C_{18}$—0.1 mf.
$C_6$—4 mf., 450 v.
$C_9$, $C_{10}$, $C_{11}$, $C_{12}$, $C_{25}$, $C_{33}$, $C_{35}$—500 mmf.
$C_{13}$, $C_{24}$—16 mf., 450 v.
$C_{14}$—10 mmf.
$C_{15}$, $C_{16}$, $C_{21}$, $C_{22}$—10 mf., 50 v.
$C_{19}$, $C_{20}$—0.02 mf.
$C_{28}$, $C_{29}$, $C_{34}$, $C_{52}$, $C_{54}$, $C_{56}$—0.001 mf.
$C_{32}$, $C_{51}$—0.005 mf.
$C_{36}$—0.002 mf.
$C_{38}$—900 mmf.
$C_{39}$—250 mmf.
$C_{40}$, $C_{41}$, $C_{53}$, $C_{55}$—0.05 mf.
$C_{46}$, $C_{47}$—80 mf., 450 v.
$C_{48}$, $C_{49}$—50 mf., 50 v.
$C_{50}$—5 mmf.
$R_1$, $R_2$, $R_5$, $R_{35}$, $R_{49}$—75,000 ohms
$R_3$—1,300 ohms
$R_4$, $R_{14}$, $R_{15}$—5,000 ohms
$R_6$, $R_7$, $R_{12}$, $R_{13}$, $R_{23}$, $R_{39}$—0.5 megohm
$R_8$, $R_9$, $R_{22}$, $R_{24}$, $R_{36}$, $R_{38}$, $R_{45}$—0.1 megohm
$R_{10}$, $R_{11}$, $R_{16}$, $R_{17}$, $R_{34}$—1 megohm
$R_{18}$, $R_{19}$, $R_{31}$, $R_{43}$—0.25 megohm
$R_{20}$, $R_{21}$, $R_{27}$, $R_{42}$—1,500 ohms
$R_{25}$—40,000 ohms
$R_{26}$—2,000 ohms
$R_{28}$—10,000 ohms
$R_{29}$—150 ohms
$R_{30}$—50,000 ohms
$R_{32}$—5,450 ohms
$R_{33}$—31,000 ohms
$R_{37}$—0.15 megohm
$R_{40}$—200 ohms
$R_{41}$—50 ohms
$R_{44}$—0.1 megohm potentiometer
$R_{46}$—50,000 ohms, 4 watts
$R_{47}$, $R_{48}$—4,500 ohms
$R_{50}$—0.3 megohm
$L_1$—45 turns 1.5″ dia. #30 enam. tapped @ ¼ and ½
$L_2$—23 turns 1.5″ dia. #24 enam. tapped @ ¼ and ¾
$L_3$—23 turns 1.5″ dia. #24 enam.
$L_4$, $L_6$, $L_7$, $L_{10}$, $L_{13}$—2.5 MH RFC
$L_5$—54 UH 42 turns 1.25″ dia. #26 enam.
$L_8$—"peaking" Coil" 35 turns, 1.25″ dia. #24 enam.
$L_9$—30 H filter choke.
$L_{11}$—12 turns ⅞″ dia. #16 enam.
$L_{12}$—(1.52 UH approx.) 9 turns ⅞″ dia. #16 enam. tapped 4 turns up from ground.
$T_1$—double button microphone transformer
$T_2$—6.3 v. @ 3 a., 700 v. c. t. @ 70 ma. 5 v. @ 2 a.

I claim:

1. An electrical frequency control system comprising: a reference oscillator circuit; a controlled oscillator circuit including tuning means; phase-shifting means deriving energy from one of the oscillator circuits, these means shifting the phase of the derived energy; first mixing means deriving input from both oscillator circuits for producing a first beat note having a certain frequency; second mixing means deriving energy from both oscillator circuits but from one of these through the phase-shifting means and producing a second beat note having the same frequency as, but out-of-phase with, the first beat note; and a multi-phase motor having two sets of motor circuits and responsive to a difference between the frequencies of the two oscillator circuits for operating the tuning means to remove such difference, one set of motor circuits having as its input the first beat note, while the other set has as its input the second beat note, each set including means for converting its input into two currents out of phase with each other.

2. An electrical frequency control system, as described in claim 1, in which the means for converting the input of each set of motor circuits include two branch circuits, one branch circuit having a different ratio of reactance to resistance from that of the other branch circuit.

RICHARD H. RANGER.

REFERENCES CITED

The following references are of record in the file of this patent:

UNITED STATES PATENTS

| Number | Name | Date |
|---|---|---|
| 1,873,842 | Hyland | Aug. 23, 1932 |
| 1,934,000 | Bollman | Nov. 7, 1933 |
| 2,379,689 | Crosby | July 3, 1935 |
| 2,017,894 | Cody | Oct. 22, 1935 |
| 2,041,855 | Ohl | May 26, 1936 |
| 2,151,127 | Logan | Mar. 21, 1939 |
| 2,303,654 | Newton | Dec. 1, 1942 |
| 2,358,454 | Goldstine | Sept. 19, 1944 |
| 2,367,868 | Jones | Jan. 23, 1945 |